Oct. 25, 1927.
L. W. CHASE
STEERING GEAR
Filed Jan. 3, 1927
1,647,034
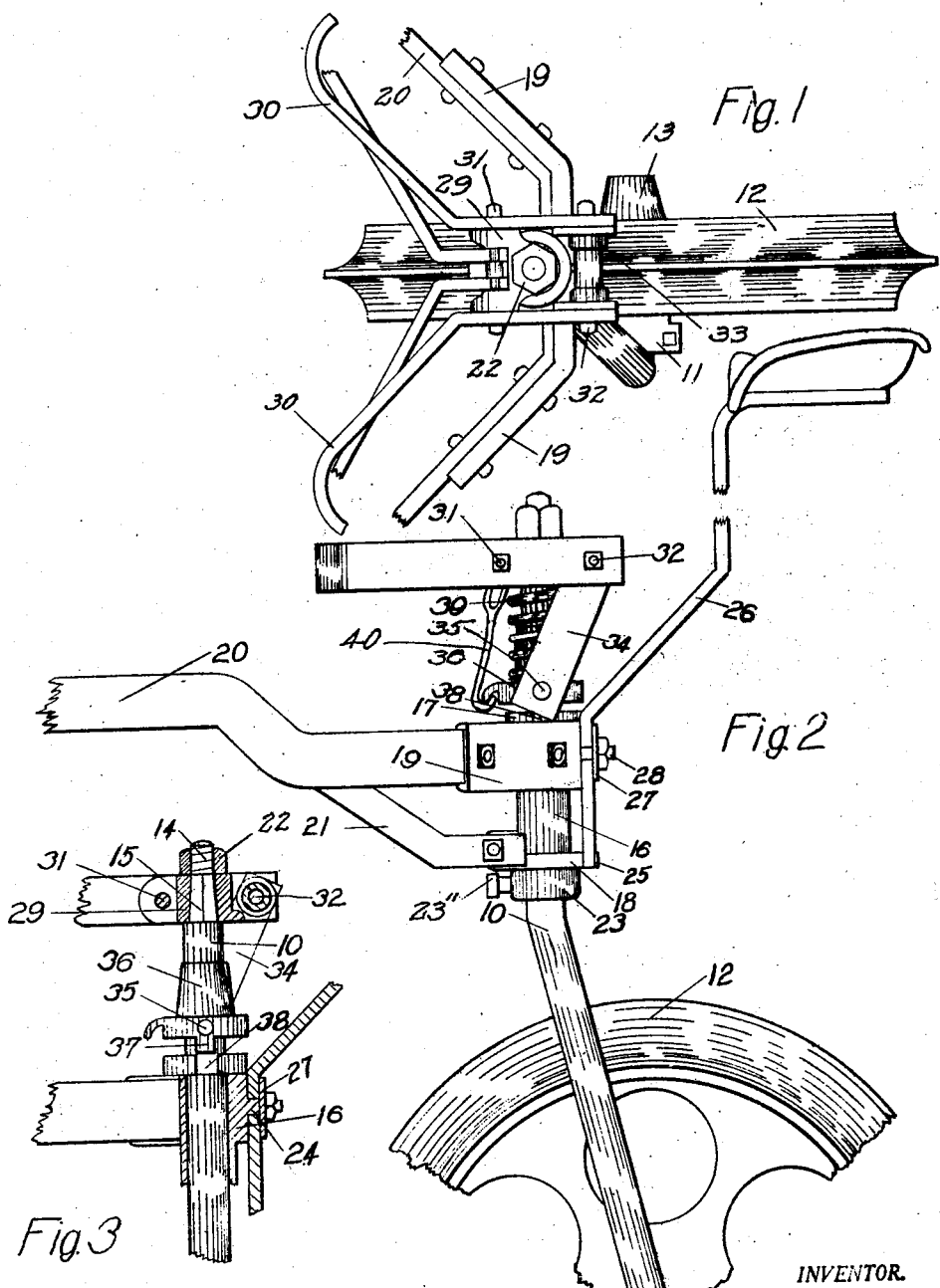
INVENTOR.
L. W. Chase
BY Emil F. Lange
ATTORNEY.

Patented Oct. 25, 1927.

1,647,034

UNITED STATES PATENT OFFICE.

LEON W. CHASE, OF LINCOLN, NEBRASKA, ASSIGNOR TO CHASE PLOW COMPANY, A CORPORATION OF NEBRASKA.

STEERING GEAR.

Application filed January 3, 1927. Serial No. 158,792.

My invention relates to steering wheel connections for cultivators and its object is the provision of a foot operated device for controlling the movements of the steering wheel, the device forming a foot rest for the driver both when shifting the direction of movement of the implement and when traveling in a straight line, and the wheel being normally latched against steering movement but the latching connection being such that it engages and releases automatically at the beginning and end of the steering operation. The invention also contemplates the provision of means for releasably maintaining the latching device in its unlatched position.

Having in view these objects and others which will be pointed out in the following description, I will now refer to the drawings, in which Figure 1 is a plan view showing the connections of the steering wheel with the rear end portion of the cultivator frame.

Figure 2 is a side elevation of the parts shown in Figure 1.

Figure 3 is a view similar to that of Figure 2 but showing some of the parts in section.

The wheel standard 10 is pivotally secured to the cultivator frame and it is first bent rearwardly and then laterally to pass through the sand box 11 and through the hub of the wheel 12 to which it is secured by means of a hub cap 13. All of this is common construction but at its upper end the standard is modified as shown in Figure 3, having its upper end portion reduced and formed into a screw threaded end portion 14 and into a portion 15 which is in the form of a frustrum of a pyramid. The diagonal at the base of the portion 15 is less than the diameter of the standard 10 so that a distinct shoulder is formed at the junction.

The sleeve 16 surrounds the standard 10 and this sleeve is provided with an outwardly projecting flange 17 at its upper extremity and with a similar flange 18 at its lower extremity. The sleeve 16 is in the form of a casting having a pair of forwardly and outwardly diverging channeled members 19 to which the frame members 20 of the cultivator are secured by means of bolts or the like. At its lower extremity the sleeve 16 is provided with forwardly projecting ears to which the brace members 21 are secured, the brace members 21 being secured at their forward ends to the members 20. A collar 23 encircles the standard 10 immediately beneath the sleeve 16 and it is held thereto by means of a set screw 23'. The collar 23, of course, prevents upward movement of the standard 10 in its bearing in the cultivator frame.

Projecting rearwardly from the sleeve 16 are two lugs 24 and 25 and the seat support 26 is provided with two apertures for receiving these lugs. The length of the lugs 24 and 25 is equal to or less than the thickness of the seat support 26. A strap 27 is positioned transversely across the seat support and it is secured to the members 19 by means of a pair of bolts 28. This provides an exceedingly rigid connection for the seat support.

Surrounding the portion 15 of the wheel standard is a casting 29 having the form shown in Figure 1. This casting rests on the shoulder and is secured in place by means of the nut 22. The casting has a pair of forwardly projecting ears to which foot levers 30 are pivotally secured by means of the pin 31, the pedals having stirrups which are arranged in convenient position with reference to the driver's seat. The pin 31 constitutes a pivotal connection so that when the forward ends of the foot levers 30 are depressed it causes the rear extremities to rise. The foot levers 30 are connected at their rear extremities by means of a pin 32 and they are spaced by means of a collar 33 surrounding the pin 32. The links 34 are also secured to the pin 32 and at their lower ends the links 34 are connected to bosses 35 on the slidable collar 36. The collar 36 has a pair of downwardly projecting lugs 37 which are adapted to seat in the sockets 38 to prevent rotation of the standard 10. The collar 36 is held in its depressed position by means of the coil spring 39, and when the collar 36 is depressed, rotation of the standard 10 in its vertical bearing will be impossible because of the relation of the lugs 37 to the sockets 38 and because of the fact that the collar 29 is secured against rotation on the standard 10. It will be apparent, however, that when the forward ends of the foot levers 30 are depressed the links 34 and collar 36 will be elevated to release the lugs 37 from engagement in the sockets 38. When the holding means are thus released the wheel 12 may be used as a steering wheel by forcing the foot levers laterally. When the parts are locked the wheel 12 tends to maintain the travel of the implement in a straight line. When traveling in irregular corn rows where quick responses are required it is desirable to keep the wheel 12 in its steering position as shown in Figure 2. The collar 36 is provided with a hooked projection at its forward end and this hooked projection is engageable by a hook 40, the hook 40 being pivotally secured to swing freely into the path of the hooked projection on the collar 36.

The connections as above described are designed for use on a cultivator having a front wheel support and in which the side beams of the frame converge rearwardly. The steering wheel and its connections are thus secured to the triangular cultivator at its rear apex. It is obvious, however, that the steering wheel and its connections might be found to be equally useful in other relations, as for example, in other implements and on trucks and tractors, and for this reason I lay claim to the novel features of the wheel connections per se and I do not desire to be restricted to the particular use which I have described.

The connections have, however, a peculiar advantage especially in their use with cultivators. The driver is seated rearwardly of the implement and high enough to see the entire implement and to observe all of the irregularities of the corn row so that he can properly guide the implement. If the implement is operating on level ground in straight rows, it is only necessary to guide the draft animals. If the implement then runs into a stretch of irregular rows, he merely depresses the foot levers and guides the implement according to the row. In spots where frequent shifts are required, the automatic hook 40 will be of great importance as it permits the driver to concentrate his attention on the steering operation. In rows where the steering wheel is actuated only infrequently, the latch 37—38 will make it easy for the driver to guide the implement in a straight line and to shift it out of its straight-line course only at the infrequent irregularities, the hook 40 under such circumstances being swung around where it cannot engage the hooked end of the collar 36.

Having thus described my invention in such full, clear, and exact terms that its construction and operation will be readily understood by others skilled in the art to which it pertains, what I claim as new and desire to secure by Letters Patent of the United States is:

1. A steering wheel having a vertical standard, a bearing for said standard, a lever secured to said standard for rocking said standard in its bearing, a spring pressed latch for holding said standard against rocking movement in said bearing, means operable by said lever for releasing said latch, and means automatically engaging said latch to hold said latch in its released position.

2. A steering wheel having a vertical standard, a bearing for said standard, a lever secured to said standard for rocking said standard in said bearing, a spring pressed latch for holding said standard against rocking movement in said bearing, said lever having a horizontal transverse axis for rocking movement, a link secured to said lever and to said latch for releasing said latch by downward pressure on said lever, and means for holding said latch in its released position, said means being automatically operable upon the actuation of said lever in releasing said latch.

3. A steering wheel having a vertical wheel standard, a bearing for said standard, a collar slidably and nonrotatably secured to said standard above said bearing, a projection depending from said collar, said bearing being provided with a notch for receiving said projection to latch said collar and said wheel standard against rocking movement in said bearing, means yieldably holding said projection in engagement in the notch in said bearing, a lever secured to said standard for rocking said standard in its bearing, and means operable by said lever for releasing said projection from engagement in the notch in said collar.

4. A steering wheel having a vertical wheel standard, an implement frame having a bearing for said standard, a seat support and a seat secured to said implement frame rearwardly of said wheel standard, a pair of horizontally positioned diverging foot levers secured to said wheel standard for rocking said wheel standard in said bearing, a latching device between said wheel standard and said bearing for holding said wheel standard against rocking movement in said bearing, said latching device including a collar surrounding said wheel standard and slidable thereon, said levers being secured to rock about a horizontal transverse pivot, links secured to said levers and to said collars for releasing said latching device when the forward extremities of said levers are depressed, and a hook for holding said collar out of latching relation, said hook being adapted to automatically engage said collar when said collar is out of latching relation.

5. In combination with a vehicle frame and a steering wheel having a vertical post, a pair of divergent foot levers secured to said post and projecting forwardly therefrom and terminating in foot rests, a latch on said post for normally preventing steering movement thereof, and a link connection between said foot levers and said latch for releasing said latch and thus permitting the steering of said vehicle frame through said foot levers.

In testimony whereof I affix my signature.

LEON W. CHASE.